US011455661B2

(12) United States Patent
Chud

(10) Patent No.: US 11,455,661 B2
(45) Date of Patent: *Sep. 27, 2022

(54) FILTERING SUPPLEMENTARY CONTENT USING COMPLETION RATE

(71) Applicant: Amazon Technologies, Inc., Seattle, WA (US)

(72) Inventor: Andrew Christopher Chud, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/485,754

(22) Filed: Sep. 27, 2021

(65) Prior Publication Data
US 2022/0058695 A1 Feb. 24, 2022

Related U.S. Application Data

(63) Continuation of application No. 16/996,589, filed on Aug. 18, 2020, now Pat. No. 11,157,965.

(51) Int. Cl.
*G06Q 30/02* (2012.01)
*G06N 20/00* (2019.01)
*H04N 21/262* (2011.01)
*H04N 21/258* (2011.01)
*H04N 21/234* (2011.01)

(52) U.S. Cl.
CPC ......... *G06Q 30/0271* (2013.01); *G06N 20/00* (2019.01); *G06Q 30/0277* (2013.01); *H04N 21/23424* (2013.01); *H04N 21/25883* (2013.01); *H04N 21/26241* (2013.01)

(58) Field of Classification Search
None
See application file for complete search history.

(56) References Cited

U.S. PATENT DOCUMENTS

| | | | |
|---|---|---|---|
| 9,406,277 | B1 | 8/2016 | Letourneur |
| 2010/0211439 | A1* | 8/2010 | Marci .................. H04N 21/252 705/7.29 |
| 2017/0311035 | A1 | 10/2017 | Lewis et al. |
| 2022/0020052 | A1* | 1/2022 | Grover ............... G06Q 30/0247 |

* cited by examiner

*Primary Examiner* — James R Marandi
(74) *Attorney, Agent, or Firm* — Lee & Hayes, P.C.

(57) ABSTRACT

Systems and methods record tracking events during a presentation of supplementary content items to determine whether viewer(s) stopped watching the supplementary content item or watched the supplementary content item in its entirety. This determination may provide value to content publishers or (multi video programming distributors (MVPDs)) through preventing such supplementary content items from showing, whether in certain contexts, to certain viewers, and/or to certain audience segments. In some instances, the systems and methods may utilize machine-learning model(s) to determine which combinations of supplementary content items, contextual signals, viewers, and/or audience segments are likely to abandonment a supplementary content item. Preventing these combinations from showing, improves viewer experiences, permits MVPDs to effectively utilize opportunities for presenting supplementary content to viewers, in order to maximize revenue yield paid by supplementary content providers (e.g., advertisers), and efficiently uses computing resources to present supplementary content items that viewers are unlikely to abandon.

20 Claims, 5 Drawing Sheets

FILTERING SUPPLEMENTARY CONTENT USING COMPLETION RATE

CROSS-REFERENCE TO RELATED APPLICATION

This patent application is a continuation of and claims priority to U.S. Utility patent application Ser. No. 16/996,589, filed Aug. 18, 2020, which is fully incorporated herein by reference.

BACKGROUND

Content publishers, such as multichannel video programming distributors (MVPDs), derive income from the sale of advertising time to advertisers that want to promote their goods and/or services. Oftentimes, advertisers intend to target those viewers that are likely to be interested in their products and/or services. One common technique is to target viewers according to a particular type of television programming, geographical area, and/or behavioral characteristics.

With certain advertisements, there is no easily discernable way to determine its success or effectiveness. Additionally, some advertisements may be repulsive, uninteresting, irrelevant, or otherwise fail to garner the attention of the viewer. In such instances, the viewer may change the channel, turn off his or her device, or otherwise abandon the advertisement before it completes playback. Here, revenues associated with presenting future advertisement(s) are lost. Moreover, computing resources spent determining the advertisements to present are unrealized.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
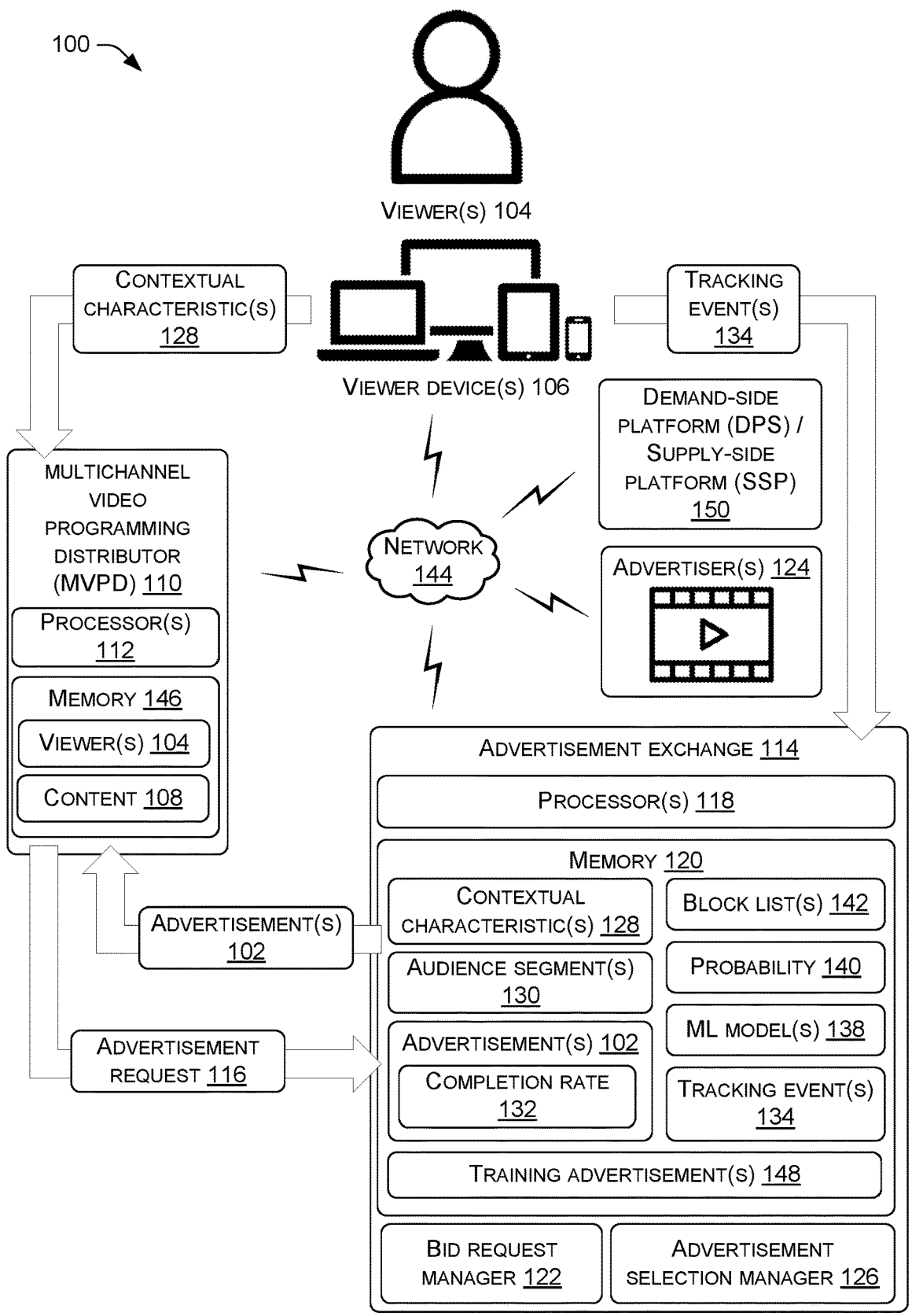
FIG. 1 illustrates an example environment for filtering supplementary content based at least in part on a probability of completion, according to an embodiment of the present disclosure. In some instances, an exchange (e.g., advertisement exchange and/or advertisement server) that stores and/or presents supplementary content may determine probabilities associated with viewers abandoning the supplementary content prior to their completion. The exchange may represent a supplementary content server working in conjunction with a number of other supply-side and/or demand-side systems. Based on the probabilities, the exchange may use the probabilities to prevent supplementary content from being presented to the viewer and/or audience segments under certain contexts.

Described herein are, among other things, systems and methods for filtering supplementary content based on a probability of completion. In some instances, the systems and methods may receive tracking events during a presentation of the supplementary content to determine whether the supplementary content was presented in its entirety. This determination may provide value to content publishers or MVPDs through preventing supplementary content from showing, whether in certain contexts and/or to certain viewers of certain audience segments. For example, determining that the supplementary content was abandoned by viewers of an audience segment may subsequently prevent similar supplementary content from being shown under/in similar contexts. In some instances, the systems and methods may utilize machine-learning model(s) and/or approaches to determine which combinations of supplementary content, contextual signals, viewers, and/or audience segments are likely to result in an abandonment of the supplementary content. Preventing these combinations from showing may improve viewer experiences, increase publisher revenue, increase viewer retention, efficiently use computing resources to present supplementary content that viewers are unlikely to abandon, and permit MVPDs to effectively utilize opportunities for presenting supplementary content to viewers.

MVPDs, such as such as Direct TV, Comcast, Charter, or Time Warner, or streaming services, such as Hulu, fuboTV, or Sling provide content (e.g., film and television programs) to viewers. These services may be provided to viewers through advanced television devices, such as over-the-top (OTT) devices that deliver content via the Internet to viewer devices. For example, the MVPDs may have applications running on viewer devices that present the content to the viewers. During presentation of the content, content breaks are often inserted. During these breaks, supplementary content (e.g., promotions, commercials, advertisements, etc.) is/are presented to the viewer. In some instances, the MVPDs interact or communicate with a supplementary content exchange (e.g., advertisement exchange, advertisement sever, Supply Side Platform (SSP) (e.g., SpotX), Demand Side Platform (DSP) (e.g., The TradeDesk), etc.) for obtaining supplementary content or supplementary content items for presenting to the viewer. As used herein, advertisements, supplementary content, supplementary content item(s), etc. may be used interchangeably. However, in some instances, supplementary content may encompass advertisements, additional content that is supplementary to what the viewer is watching (e.g., info about the content, actors/actresses, directors, series, etc.), about to watch, downloaded, or material that is presented during a portion or in lieu of main content presented to the viewer.

The supplementary content exchange may determine supplementary content for presenting to the viewer. In some instances, the supplementary content may be selected based on one or more contextual signals associated with the viewer (e.g., viewer device type, language settings, screen resolution, time of day, etc.), content being presented to the viewer and/or characteristics associated with the content (e.g., genre, rating, identifiers, streaming content, live content, program, etc.), whether the viewer is viewing the content via an application on the viewer device or a through a website, one or more audience segment(s) to which the viewer belongs, behavioral characteristics of the viewer, and/or a geographical area of the viewer. This information may be used to select and/or filter supplementary content (e.g., advertisements) targeted towards the viewer and which the viewer is likely to watch and/or buy the presented goods and/or services. By way of example, if the viewer is watching content related to a golf, advertisers may purchase space to present supplementary content for golf apparel, rather than another type of sports apparel, such as biking. Additionally, viewers in one geographical location may likely be more interested in goods and/or services from a particular advertiser than viewers in a different geographical location. In such instances, the supplementary content exchange may receive this information from the MVPDs and/or the viewer devices, whether directly or indirectly. For example, the MVPD may provide indications of the device type and/or the language settings to the supplementary content exchange for use in selecting the supplementary content. The supplementary content exchange may also store such contextual characteristics.

After selecting supplementary content, the supplementary content exchange may transmit the supplementary content to the MVPD and the MVPDs cause the supplementary content to be presented to the viewer. Additionally, in some instances, more than one supplementary content item may be selected for a particular break for presenting to the viewer. Here, the MVPDs may cause the supplementary content to be presented consecutively.

The MVPDs obtain revenue through showing the supplementary content. For example, in instances where the supplementary content is presented, the MVPDs obtain revenue from the advertisers through showing their supplementary content. However, in some instances, viewer(s) may abandon the supplementary content (e.g., stop watching) and in such instances, this represents lost opportunities to present additional supplementary content to the viewer. Viewers may abandon the supplementary content by switching to a different program, channel, turning off the viewer device, and/or switching to a different OTT MVPD. In such instances, the viewer may not watch an entirety of the supplementary content. For example, the supplementary content may be irrelevant, repetitive, uninteresting, too personal, and/or sensitive. In such instances, the MVPD may receive revenue associated with presenting that supplementary content but may lose opportunities to present subsequent supplementary content. For example, the MVPD may receive a packet or bundle of advertisements to present but only a subset of these advertisement may be viewed by the viewer before abandonment.

To track a progress or completion of the supplementary content, the supplementary content exchange may receive indications associated with the supplementary content being displayed to the viewer. These indications (e.g., tracking events) may be received when the supplementary content started playback, when each quartile (or portion) of the supplementary content completes playback, and/or when the entire supplementary content completes playback. The indications may therefore be received throughout the playback of the supplementary content for use by the supplementary content exchange to determine how much of the supplementary content was played. For example, if the supplementary content exchange did not receive an indication that supplementary content completed playback, then the supplementary content exchange may determine that the viewer abandoned the supplementary content. In such instances, the supplementary content exchange may reference a last received indication for knowing how much of the supplementary content was presented. Moreover, by failing to receive an indication that the supplementary content completed playback, the supplementary content exchange may infer that the viewer did not watch the entirety of the supplementary content. Additionally, from the indications received, the supplementary content exchange may determine a time or location within the supplementary content at which the viewer stopped watching.

By tracking a playback of the supplementary content, the supplementary content exchange may correlate the supplementary content with a negative viewing experience or determine that the context in which the supplementary content was presented resulted in viewer abandonment. For example, the supplementary content exchange may correlate viewer(s) abandoning the supplementary content with the context in which the supplementary content was presented. From this, the supplementary content exchange may determine that viewers do not want to watch the supplementary content in the context of the content being played. Additionally, the supplementary content exchange may determine which combinations of supplementary content, context, audience segments, and/or behavioral characteristics are likely to result in viewers abandoning the supplementary content and/or content in future instances.

Knowing information about the content being watched by the viewer, audience segments of the viewer, and/or behavioral characteristics of the viewer, the supplementary content exchange may determine that certain supplementary content should be blocked given a completion rate of the supplementary content. That is, the supplementary content exchange may track a completion rate of the supplementary content and this completion rate may be used when determining whether viewers are likely to abandon the supplementary content. For example, if viewers of an audience segment typically abandon supplementary content, under certain contextual characteristic(s), the supplementary content may be withheld from being presented to the viewer in such contexts.

In some instances, based on viewer abandonment and/or determining that viewers are likely to abandon the supplementary content, the supplementary content may be associated with certain contexts and/or audience segments. These associations may be organized into a block list, where the block list represents a list of supplementary content (or a category or type of supplementary content) that are not to be presented to viewers of certain audience segments in certain contexts. The supplementary content on the block list may have a high probability (e.g., above a threshold) that viewers of an audience segment will (or are likely to) abandon the supplementary content if presented. The probabilities may be determined before presenting the supplementary content and used when the supplementary content exchange determines the supplementary content to present.

In some instances, the block lists may each be associated with a context, audience segment, and/or behavioral characteristics. For example, viewers may enjoy watching particular supplementary content in certain contexts, but not another. Here, the particular supplementary content may be appropriate for presenting in the first context, but not the latter. Additionally, or alternatively, regardless of the context, some supplementary content may not be relevant to the viewers and may be blocked entirely. These relationships may be determined by the supplementary content exchange, in advance, for computing probabilities that the viewers are likely or unlikely to abandon. Based on the generated probabilities, the supplementary content may be blocked or permitted. Therein, the supplementary content exchange may use the block list(s) for determining supplementary content to present.

For example, the supplementary content exchange may receive a request from the MVPD for supplementary content and the supplementary content exchange may fulfill the request. The supplementary content exchange may fulfill the request based on contextual signals (e.g., key value pairs, such as deviceType=FireTV) received from the MVPD, the generated block lists, audience segments of the viewers, completion rates of the supplementary content, and so forth. In some instances, the supplementary content exchange may fulfill the request through accepting bids from advertiser(s). After receiving the bids, the supplementary content exchange may rank the bid(s) based on one or more criteria (e.g., relevance, generated revenue, cost of supplementary content, etc.) for selecting one or more supplementary content to present to the viewer. The bid(s) may also be ranked according to the details transmitted in the supplementary content request (e.g., contextual signals). Additionally, the supplementary content exchange may also filter supplementary content, or bid(s), that would otherwise violate the block list(s) if presented. That is, using the previously generated block list(s) and/or determined probabilities, if one of the bids includes a supplementary content that is on a block list, the supplementary content exchange may not consider that supplementary content for presentation to the viewer.

Once the supplementary content is/are determined, the supplementary content may be transmitted to the MVPD for presentation to the viewer. In some instances, the MVPD may stitch the supplementary content into the content presented to the viewer and/or the MVPD may fetch supplementary content as needed (e.g., during breaks). Additionally, in some instances, the MVPD may include supplementary content of its own and may not communicate with the supplementary content exchange for receiving supplementary content. Moreover, in some instances, the supplementary content exchange may communicate directly with the viewer device for presenting the supplementary content.

During presentation of the supplementary content, and as introduced above, the supplementary content exchange may track a viewing of the supplementary content by the viewer. If, for example, the viewer abandons the supplementary content, the supplementary content exchange may record this for use in updating the block list(s) for future use in determining supplementary content that is/are likely to abandon. For example, the supplementary content exchange may employ the machine-learning model(s) to flag the supplementary content and avoid presenting the supplementary content in future instances under similar context(s) and/or to similar viewers. In some instances, the block list(s) may be updated in real-time and/or during pre-schedule offline updates. In such instances, the supplementary content exchange may aggregate feedback (e.g., abandoned or finished watching the supplementary content) received from multiple viewers of an audience segment to update the block list.

Furthermore, the feedback received from the viewers permits the machine-learning model(s) to determine complex relationships between the content that the viewer is watching, the context in which the viewer watches the supplementary content, the supplementary content itself, audience segment(s) to which the viewer belongs, and so forth. For example, in subsequent instances in which the MVPD submits supplementary content requests, the supplementary content exchange may utilize the machine-learning model(s) to identify supplementary content items to include on a block list based on the current content being viewed by the viewer, a completion rate of the supplementary content, and/or a context in which the viewer is watching the content (e.g., device, time, location, language, etc.). As such, the supplementary content exchange may use this criteria (e.g., contextual signals) to avoid returning supplementary content items that are included on the block list or which would otherwise violate the block list(s). In some instances, the machine-learning model(s) may be trained for each audience segment and contextual characteristic(s) combination to avoid pre-computing block list for specific viewers.

This refinement of supplementary content selection represents an efficient use of computing resources in the digital context. For example, in instances where supplementary content items are abandoned, the time and computing resources spent selecting these supplementary content items is unrealized. This represents an inefficient use of computing resources that were expended to determine supplementary content for the viewer, but which were ultimately not viewed by the viewer. Maintaining block lists that includes combinations of supplementary content, viewers, and context that have a likelihood of being abandoned permits the supplementary content exchange to return supplementary content that is/are likely to be watched in their entirety. That is, knowing the probability that the viewer will abandon supplementary content permits the supplementary content exchange from delivering those items for presentation to the viewer. Accordingly, presenting those supplementary content items that are unlikely to be abandoned represents an efficient use of computing resources and avoids the use of computing resources that would have been used to select and present supplementary content that subsequently would likely have been abandoned. In such instances, the supplementary content exchange and/or the MVPD more effectively utilize their computing resources to maximize opportunities to present supplementary content items to improve viewer experiences, increase publisher revenue, and/or increase viewer retention.

In some instances, the MVPD may utilize the supplementary content exchange as a service for preventing the supplementary content on the block lists to be blocked. For example, the supplementary content exchange may offer services to the MVPD for filtering the supplementary content to increase viewer retention and/or viewing experiences when engaging the MVPD.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for determining advertisement(s) 102 (e.g., supplementary content, supplementary content item, etc.) to present to viewer(s) 104 (which might be referred to herein singularly as "the viewer 104" or in the plural as "the viewers 104"). As illustrated, the viewer(s) 104 may utilize viewer device(s) 106 (e.g., e.g., mobile telephones, tablet devices, gaming consoles, televisions, laptop or desktop computers, etc., etc.) for streaming or watching content 108 (e.g., television shows, programs, films, movies, audio, etc.). In some instances, the viewer device(s) 106 may be smart devices themselves or include accessory devices that plug into or communicatively couple to the viewer device(s) 106, such as OTT devices. In this context, the OTT devices may plug directly into the viewer device(s) 106 for enabling applications and/or content streaming to the viewer device(s) 106.

The content 108 may be provided or supplied via a multichannel video programming distributor (MVPD) 110. For example, the MVPD 110 may offer the content 108 to the viewer(s) 104 for viewing, whether by a subscription, pay per view, trial, and so forth.

The MVPD 110 is shown including processor(s) 112 and memory 136, where the processor(s) 112 perform various functions and operations described herein and the memory 136 may store instructions executable by the processor(s) 112 to perform the operations described herein. For example, the memory 136 is shown including or having access to the viewer(s) 104 and the content 108, for distributing or presenting to the viewer(s) 104.

The viewer(s) 104 may represent individuals who view the content 108 provided by the MVPD 110. In some instances, the MVPD 110 may store the content 108 for providing to the viewer(s) 104 (via the viewer device(s) 106) and/or the content 108 may be located on one or more additional servers, databases, and/or third-party platforms. During presentation of the content 108, the MVPD 110 may insert the advertisement(s) 102 into the content 108 or otherwise cause the advertisement(s) 102 to be presented to the viewer(s) 104. In some instances, the content 108 may include advertising breaks that instruct or signal the MVPD 110 to supply the advertisement(s) 102 to the viewer(s) 104 and/or cause the advertisement(s) 102 to be presented.

The MVPD 110 may communicatively couple to an advertisement exchange 114 for obtaining the advertisements 102 for presenting to the viewer 104. For example, during an advertising break, the MVPD 110 may submit an advertisement request 116 to the advertisement exchange 114. The advertisement request 116 may represent a request for advertisements 102 for presenting to the viewer 104. In some instances, the advertisement exchange 114 is configured to utilize the advertisement request 116 for searching and/or selecting advertisements 102 for presentation to the viewer 104. Generally, the advertisement exchange 114 may represent a marketplace of advertisement(s) 102 or a platform in which advertisement(s) 102 are exchanged. For example, the role of the advertisement exchange 114 may be to return the advertisements 102, such as an advertisement server, a SSP, and/or a DSP.

The advertisement exchange 114 is shown including processor(s) 118 and memory 120, where the processor(s) 118 perform various functions and operations described herein and the memory 120 may store instructions executable by the processor(s) 118 to perform the operations described herein. a bid request manager 122 of the advertisement exchange 114 may post or request bids based on the advertisement request 116. In some instances, the bids posted by the bid request manager 122 may indicate the length of advertisement(s) 102 sought, information associated with the viewer 104, and/or information associated with the viewer device 106 (e.g., language) presenting the content 108. This information may be used to assist advertiser(s) 124 in determining whether they want to submit a bid for the advertisement break. That is, the advertiser(s) 124, who generate and/or produce the advertisement(s) 102, may bid on advertisement break(s) according to the specifics of the advertisement break.

The advertisement exchange 114 includes the advertisement selection manager 126 for managing the bids and ultimately selecting a bid. For example, upon receipt of the bids and the advertisement(s) 102, the advertisement selection manager 126 may filter and/or rank the bids and/or the advertisement(s) 102 associated with the bids. In some instances, the advertisement selection manager 126 may filter the bids based on the criteria included in the advertisement request 116. In some instances, the advertisement selection manager 114 may compile multiple advertisement(s) 102 for presentation to the viewer 104. Regardless, upon the selection of the advertisement(s) 102, the advertisement exchange 114 may transmit the advertisement(s) 102, or data associated with the advertisement(s) 102, to the MVPD 110. In response, the MVPD 110 may deliver the advertisement(s) 102 to the viewer device(s) 106 or otherwise cause the advertisement(s) 102 to be presented to the viewer 104 in association with the content 108. The viewer device(s) 106 presenting the content 108 may include applications (e.g., the applications displaying the content 108) that integrate the advertisement(s) 102 into the content 108. In some instances, the MVPD 110 may stitch the advertisement(s) 102 into the content 108 and then provide the content 108 with the advertisement(s) 102 to the viewer device(s) 106.

The advertisement exchange 114 may have access to various information of the viewer(s) 104 for presenting advertisement(s) 102 or for use in determining which advertisement(s) 102 to present, or to not present, to the viewer(s) 104. For example, knowing the current content 108 being presented to the viewer(s) 104 may be used to determine relevant and/or irrelevant advertisement(s) 102. In some instances, this information may be stored as contextual characteristic(s) 128 within the memory 120 of the advertisement exchange 114. The contextual characteristic(s) 128 may include information associated with the content 108 being presented the viewer(s) 104 (e.g., program, show, channel, episode, movie, etc.), a time at which the content 108 is being presented, a current location within the content 108 the viewer 104 is watching. The contextual characteristic(s) 128 may also relate to a geographical location of the viewer 104, a type of viewer device 106 used by the viewer 104 to watch the content, a language setting of the viewer device 106, a screen resolution of the viewer device 106, and so forth. However, the contextual characteristic(s) 128 may relate to, or include, other information related to the context in which the viewer 104 is watching the content 108 (e.g., streaming versus live event, whether the content 108 is accessed through an application or website) and/or attributes of the content 108 (e.g., genre, rating, etc.).

In some instances, the advertisement exchange 114 may receive the contextual characteristics 128 via the MVPD 110 and ultimately, from the viewer device(s) 106. For example, the MVPD 110 may provide the contextual characteristic(s) 128 to the advertisement exchange 114 as part of the advertisement request 116. In some instances, the MVPD 110 may store the contextual characteristic(s) 128 associated with the viewer 104 and/or the viewer device 106, and upon receiving an indication to present the advertisement(s) 102 during display of the content 108, may forward the contextual characteristic(s) 128 with the advertisement request 116.

The advertisement exchange 114 may also utilize audience segment(s) 130 of the viewer 104 for determining advertisement(s) 102 to present, or to not present. In some instances, the audience segment(s) 130 may correspond to group(s) and/or classes that the viewer(s) 104 belong. Generally, the audience segment(s) 130 may divide or classify the viewer(s) 104 into distinct subgroups based on characteristics of the viewer(s) 104. Viewer(s) 104 within the same audience segment(s) 130 may watch similar content 108 and/or have similar behaviors. For example, if the viewer 104 is a mom that lives in Seattle, Wash., the viewer 104 may belong to an audience segment 130 corresponding to moms that live in a geographical area associated with Seattle, Wash. The audience segment(s) 130 to which the viewer 104 is associated may additionally, or alternatively, be based on demographics or other viewer traits (e.g., gender identity, age, ethnicity, income, lifestyle, education, purchase history, and so forth.) In some instances, the viewer(s) 104 may belong to multiple audience segments 130.

As shown, the memory 120 may store a completion rate 132 in association with the advertisement(s) 102. In some instances, each advertisement 102 may have an associated completion rate 132 that represents a percentage or amount of time the advertisement 102 is viewed in its entirety. In some instances, the advertisement exchange 114 may store multiple completion rates 132 for the advertisements 102. For example, the completion rate 132 may relate to an average completion rate for the advertisement 102 across all contexts and across all audience segments 130 (e.g., an overall completion rate). Additionally, the advertisement exchange 114 may store a completion rate that represents the completion rate for an audience segment 130 and each contextual characteristic 128. For example, a completion rate 132 may be stored for a certain audience segment 130 and for viewers 104 with a FireTV device.

In some instances, the advertisement(s) 102 may have any completion rate 132, such as 98%, 98.5%, 99%, and so forth. In some instances, the completion rate 132 may correspond to a success metric of the advertisement 102 and in instances where the completion rate 132 has a certain percentage (e.g., greater than a threshold), this may indicate that the advertisement 102 is successful in capturing the attention of the viewer 104. That is, advertisement(s) 102 with high completion rates 132 may be watched in their entirety by the viewer(s) 104.

During presentation of the advertisement(s) 102, the advertisement exchange 114 may determine the completion rate 132 via tracking a progress of the viewer(s) 104. For example, the advertisement exchange 114 may receive tracking event(s) 134 during a presentation of the advertisement(s) 102 on the viewer device(s) 106. In some instances, the advertisement exchange 114 may receive the tracking events 134 directly from the viewer device(s) 106 or via the MVPD 110. Regardless, the tracking event(s) 134 may be used to determine a progress or completion of the viewer 104 watching the advertisement 102. For example, the advertisement exchange 114 may receive the tracking events 134 when the advertisement 102 started playing, when each quartile (or portion) of the advertisement 102 was played, and/or when an entirety of the advertisement 102 was played. The tracking events 134 may therefore be received throughout the playback of the advertisement 102 for use by the advertisement exchange 114 to determine how much of the advertisement 102 was played. For example, if the advertisement exchange 114 did not receive a tracking event 134 that the advertisement 102 completed playback, then the advertisement exchange 114 may determine that the viewer 104 abandoned the advertisement 102. In such instances, the advertisement exchange 114 may reference a last received tracking event 134 for knowing how much of the advertisement 102 was presented. Moreover, by failing to receive the tracking event 134 that the advertisement 102 completed playback, the advertisement exchange 114 may infer that the viewer 104 did not watch the entirety of the advertisement 102. Additionally, from the tracking event(s) 134, the advertisement exchange 114 may determine a time or location within the advertisement 102 at which the viewer 104 stopped watching.

Based on the tracking event(s) 134 the advertisement exchange 114 may update the completion rate 132 of that advertisement 102. Furthermore, the completion rate 132 of the audience segment(s) 130 to which the viewer 104 belongs may be correspondingly updated. In some instances, the completion rate 132 may be updated based on aggregated feedback received from multiple viewers 104, over a certain period of time, and during an offline workflow. For example, over a certain period of time, the advertisement 102 may have been shown to 1000 viewers 104 of a certain audience segment 130. For those 1000 viewer(s) 104, 900 of the viewers 104 may have completed the advertisement 102 and 100 viewers 104 may have abandoned the advertisement 102. Correspondingly, the completion rate 132 for viewers 104 of audience segment 130 may be 90%. Additionally, the completion rate 132 for certain contextual characteristic(s) 128 may similarly updated based on the tracking event(s) 134. Moreover, in instances where the viewer 104 belongs to multiple (e.g., twenty) audience segments 130, the completion rate 132 associated with these audience segment(s) 130 may be updated.

In some instances, the viewer 104 may abandon the advertisement to watch different content 108, may turn off the viewer device 106, and/or may switch to watching the content 108 on another viewer device 106. However, knowing that the viewer(s) 104 stopped watching the advertisement 102 provides insight into which advertisement(s) 102 to present and/or to not present to the viewer 104 in future instances and/or to like viewer(s) 104 in certain audience segments 130. For the latter, knowing those advertisement(s) 102 to not present to the viewers 104 in certain contexts may equate to saving time and computing resources spent filtering and presenting those advertisement(s) 102 that the viewer 104 is likely to abandon. Stated alternatively, identifying advertisement(s) 102 that the viewer 104 is likely to not watch prevents computing resource(s) being spent identifying such advertisement(s) 102. That is, in instances where the advertisements 102 are abandoned, the time and computing resources spent selecting these advertisements 102 is unrealized. This represents an inefficient use of computing resources that were expended to determine the advertisements 102 for the viewer 104, but which were ultimately not viewed by the viewer 104. Refraining from presenting combinations of the advertisements 102, to the viewers 104, and within a context in which the viewer 104 abandoned the advertisement 102 permits the advertisement exchange to filter those advertisements 102 that are likely to be watched in their entirety by the viewer 104. Knowing a likelihood that the viewer 104 will abandon the advertisements 102 permits the advertisement exchange 114 from returning such advertisements 102 for presentation to the viewer 104. Accordingly, requesting those advertisements 102 that are unlikely to be abandoned by the viewer 104 represents an efficient use of computing resources and avoids the use of computing resources that would have been used to select/determine and present advertisements 102 that subsequently would have been abandoned. Additionally, knowing the completion rate 132 permits the advertiser(s) 124 to refine advertisement campaigns.

In some instances, the advertisement exchange 114 may attempt to associate the contextual characteristic(s) 128 with the advertisements 102 that are not watched in their entirety or were otherwise abandoned. For example, if the viewer 104 did not watch the advertisement 102 in its entirety, the advertisement exchange 114 may draw correlations between the contextual characteristic(s) 128, the viewer(s) 104, the content 108, the audience segment(s) 130, and/or the advertisement 102. If the viewer 104 belongs to a particular audience segment 130, and viewer(s) 104 of that audience segment 130 frequently abandon that advertisement 102, the advertisement exchange 114 may determine that the advertisement 102 is not well suited for viewer(s) 104 of that audience segment 130. Moreover, the advertisement exchange 114 may determine that viewer(s) 104 in the audience segment 130 typically abandon the advertisement 102 during presentation of particular content 108 or with viewers having certain contextual characteristic(s) 128. In other words, the advertisement exchange 114 may correlate an abandonment of the advertisement 102 with certain contextual characteristic(s) 128 of the viewers 104 in an audience segment 130.

To determine such correlations, the advertisement exchange 114 may, in some instances, use machine-learning (ML) model(s) 138 to determine the correlations or otherwise analyze the abandonment of the advertisements 102. For example, the ML model(s) 138 may analyze the contextual characteristic(s) 128 associated with presenting the advertisement 102, the completion rate 132, the audience segment(s) 130, the content 108, or other information, for use in determining correlations associated with the advertisement 102, the content 108, and abandonments of the advertisement 102. Such correlations may be used in future instances to avoid presenting certain advertisement(s) 102 to the viewer(s) 104 and based on similar contextual characteristic(s) 128. Additionally, the ML model(s) 138 may be used before presenting a potential advertisement to determine whether the advertisement 102 should be presented.

In some instances, the ML model(s) 138 may determine or generate a probability 140 (which might be referred to herein singularly as "the probability 140" or in the plural as "the probabilities 124") for the advertisement(s) 102 that represents a probability of the viewer 104 abandoning the advertisement 102 (or, alternatively, completing the advertisement 102 in its entirety). The individual probabilities 140 of the advertisements 102 may be determined by accessing data associated with the contextual characteristic(s) 128, the content 108, and so forth, of each viewer 104, providing the data as input to the ML model(s) 138, and generating, as output from the ML model(s) 138, the probability 140 that is associated with the advertisement 102 being abandoned. In some instances, the probability 140 may relate to a likelihood that the viewer 104 will not abandon the advertisement 102 and/or will abandon the advertisement. Regardless, the probabilities 140 output by the ML model(s) 138 may be machine-learned scores.

Machine-learning generally involves processing a set of examples (called "training data") in order to train a machine-learning model(s). A machine-learning model(s), once trained, is a learned mechanism that can receive new data as input and estimate or predict a result as output. For example, a trained machine-learning model may comprise a classifier that is tasked with classifying unknown inputs as one of multiple class labels. In some cases, a trained machine-learning model is configured to implement a multi-label classification task. Additionally, or alternatively, a trained machine-learning model may be trained to infer a probability, or a set of probabilities, for a classification task based on unknown data received as input.

In the context of the present disclosure, the unknown input may be contextual characteristic(s) 128, the viewer(s) 104, the content 108, the audience segment(s) 130, and/or the advertisement 102, and the ML model(s) 138 may be tasked with outputting the probability 140 that indicates, or otherwise relates to, a probability that the viewer 104 will abandon the advertisement 102 (or view the entire advertisement 102). This probability 140 may represent an expected completion rate 132 of the viewer 104. If the probability 140 that is output by the ML model(s) 138 relates to a likelihood that the advertisement 102 will be abandoned by the viewer 104, the advertisement exchange 114 may place the particular advertisement on block list(s) 142 of the viewer 104 and/or viewer(s) of audience segment(s) 130 to which the viewer 104 is associated with. In some instances, the advertisement 102 may be flagged for use in determining to not present the advertisement in certain context(s) and based on the contextual characteristic(s) 128. That is, in future instances, when determining whether to present a potential advertisement 102, the advertisement exchange 114 may compare the contextual characteristic(s) 128 of a current viewer 104 with those of contextual characteristic(s) 128 stored in association with the audience segment 130 and which indicate viewer 104 abandoning the advertisement 102. In such instances, the ML model(s) 138 may be trained for each audience segment 130 and contextual characteristic(s) 128 combination to avoid pre-computing block list(s) 142 for specific viewers 104.

The training data that is used to train ML model(s) 138 may include various types of data. In general, training data for machine-learning may include two components, features and labels. However, in some instances, the training data used to train the ML model(s) 138 may be unlabeled. Accordingly, the ML model(s) 138 may be trainable using any suitable learning technique, such as supervised learning, unsupervised learning, semi-supervised learning, reinforcement learning, and so on. The features included in the training data may be represented by a set of features, such as in the form of an n-dimensional feature vector of quantifiable information about an attribute of the training data. The following is a list of example features that can be included in the training data for training the ML model(s) 138 described herein. However, it is to be appreciated that the following list of features is non-exhaustive, and features used in training may include additional features not described herein, and, in some cases, some, but not all, of the features listed herein. Example features included in the training data may include, without limitation, a current program, show, episode, or content watched by the viewer 104, a time of day the viewer 104 watches the content 108, a viewer device 106 used by the viewer 104 to watch the content 108, a language associated with the viewer 104 (and/or the viewer device, the content 108, etc.), behavioral characteristics of the viewer 104 (e.g., shopping history, frequently watched shows, hobbies, interests, etc.), a screen resolution of the viewer device 106, demographics of the viewer 104, a geographical location of the viewer, content and/or specifics of the advertisement (e.g., advertiser, products, services, etc.), audience segments 130 of the viewer 104, completion rates 132 of the viewer 104, completion rates 132 of advertisement(s) 102 watched by audience segments 130 to which the viewer 104 is associated with, previously watched advertisements 102 of the viewer 104, and so forth.

To train the ML model(s) 138, the advertisement exchange 114 may store training advertisement(s) 148. The training advertisement(s) 148 may be input to the ML model(s) 138 to determine if any of the training advertisement(s) 148 have a probability 140 that exceeds the threshold. For example, the training advertisement(s) 148 may represent set of advertisements that have been shown to viewers 104 in audience segment(s) 130, and which are associated with certain contextual characteristic(s) 128. The advertisements within the training advertisement(s) 148 would need to be shown enough times (e.g., threshold) to the viewers 104 in order for the data set to be considered significant enough to use the probability 140 produced by the ML model 138. For example, if there are too few data points in the data set, then the data cannot be used for accurately predicting whether the viewer 104 will likely abandon the advertisement 102. Take for example, that a first viewer in an audience segment 130 abandons the advertisement and that the completion rate 132 for that audience segment 130 for that advertisement 102 would be 0%. However, this does not necessarily mean that the advertisement 102 should be placed on a block list 142. In other words, a confidence of the probability 140 may be low given the amount of data used to train the ML model(s) 138. For each advertisement 102, there may be an associated threshold at which the ML model(s) 138 becomes usable, after training, and based on a sample size of the training data. Each ML model(s) 138 may have an associated confidence in the output (e.g., the probability 140) for a specific set of contextual characteristic(s) 128. As such, enough data points may first be collected to ensure the reliability of the probability 140. If the data points for the advertisement(s) are not enough to exceed a threshold, then the advertisement 102 may not be considered for inclusion in the block list(s) 142 and/or may not be refrained from being presented to the viewer 104.

In some instances, as part of the training process, weights may be applied to a set of features included in the training data, as derived from the historical data. In some instances, the weights that are set during the training process may apply to parameters that are internal to the ML model(s) 138 (e.g., weights for neurons in a hidden-layer of a neural network). These internal parameters of the ML model(s) 138 may or may not map one-to-one with individual input features of the set of features. The weights may indicate the influence that any given feature, parameter, or characteristic has on the probability 140 that is output using the ML model(s) 138.

The ML model(s) 138 may represent a single model or an ensemble of base-level machine-learning models, and may be implemented as any type of machine-learning model. For example, suitable machine-learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine-learning models whose outputs (predictions) are combined, such as by using weighted averaging or voting. The individual machine-learning models of an ensemble can differ in their expertise, and the ensemble can operate as a committee of individual machine-learning models that is collectively "smarter" than any individual machine-learning model of the ensemble.

Using the ML model(s) 138 may therefore identify complex relationships between the contextual characteristic(s) 128, the viewer(s) 104, the content 108, the audience segment(s) 130, and/or the advertisement 102. For example, the ML model(s) 138 may learn to associate certain contextual characteristic(s) 128 of the viewer(s) 104 and/or the audience segment(s) 130 to indicate that viewer(s) 104 are likely or unlikely to abandon advertisement(s) 102. By way of illustration, based the contextual characteristic(s) 128, the ML model(s) 138 may determine that an audience segment 130 corresponding to forty-year old males, who are watching sports on a mobile phone in the afternoon, are likely to abandon an advertisement 102 relating to cleaning products and/or services. In future instances, when the advertisement exchange 114 presents advertisements 102 to the viewer 104, and the viewer 104 is a forty-year old male, who is watching sports on a similar device and/or time, the MVPD 110 may avoid causing advertisement 102 related to cleaning products and/or services being presented.

Introduced above, the ML model(s) 138 may identify, generate, or determine the block list(s) 142 that represent advertisements 102 that are likely to be abandoned by certain viewer(s) 104, during certain instance(s), and based on the contextual characteristic(s) 128, the content 108, the viewer(s) 104, and/or the audience segment(s) 130. The block list(s) 142 may be used for filtering or determining advertisement(s) 102 for the viewer(s) 104. For example, the ML model(s) 138 may compute which combinations of advertisement(s) 102, viewer(s) 104, audience segment(s), content 108, contextual characteristic(s) 128, and/or advertisement(s) 102 correlate to a probability 140 of the viewer 104 abandoning the content 108 and/or the advertisement 102. In such instances, the ML model(s) 138 may block these combinations from being presented to the viewer 104, via the block list(s) 142. In some instances, the ML model(s) 138 may utilize the completion rate 132 of the advertisement 102 for determining whether the viewer 104 is likely to abandon the advertisement 102. However, as noted above, enough feedback (e.g., abandonment/completion) may first be collected to ensure the reliability of the probability 140. If the feedback for the advertisement(s) 102 are not enough to exceed a threshold, then the advertisement 102 may not be considered for inclusion in the block list(s) 142. That is, despite one viewer 104 abandoning an advertisement 102, the advertisement 102 may not be placed on a block list(s) 142 for an audience segment 130 until feedback is received from multiple (or a predetermined amount) of viewer(s) 104 within the audience segment 130. Stated alternatively, the advertisement(s) 102 would need to be shown enough times to the viewers 104 in order for the feedback to be considered significant enough to use the probability 140 produced by the ML model 138.

The use of the ML model(s) 138 allows for accurately predicting whether the content 108 and/or the advertisement(s) 102 are likely to be abandoned, leading to increased viewer experiences and fewer instances of presenting advertisement(s) 102 that are abandoned by the viewer(s) 104. In some instances, the ML model(s) 138 may learn to predict which advertisement(s) 102 are likely to be abandoned by the viewer(s) 104 and/or which advertisement(s) 102 are unlikely to be abandoned. In this manner, noted above, advertisement(s) 102 with high probabilities (e.g., above threshold) may likely be abandoned by the viewer 104 and may be populated within the block list(s) 142. Advertisement(s) 102 with low probabilities (e.g., below threshold) may not likely be abandoned by the viewer 104. In some instances, the advertisement exchange 114 may only track or record those advertisement(s) 102 that are likely to be abandoned (e.g., via the block list(s) 142) and may not keep track of those advertisement(s) 102 in which the viewer 104 is likely to watch in its entirety. Although the use of a threshold is described as one example way of determining whether to include an advertisement 102 on the block list(s) 142, other techniques are contemplated, such as clustering algorithms, or other statistical approaches that use scores for use in determining whether to block certain advertisement(s) 102 from the viewer(s) 104, or a particular audience segment 130.

In some instances, the threshold utilized to determine whether the probability is indicative of the viewer 104 abandoning the advertisement 102 may be based relative to the completion rate 132 of other advertisements 102. For example, advertisement completion rates 132 on the viewer device(s) 106 may be, on average, approximately 99.5%. If the determined probability 140 is 97%, for example, the advertisement 102 may be prevented from being shown. That is, the 2.5% difference in completion rate 132 may be used to restrict the advertisement 102 from being shown.

The ML model(s) 138 is/are retrainable with new data in order to adapt the ML model(s) 138 to understand advertisement(s) 102 to withhold from presenting to the viewer(s) 104. For example, as the contextual characteristic(s) 128, behavioral characteristics, content 108, and/or the advertisement(s) 102 change, new correlations become available. The ML model(s) 138 may be retrained in instances where viewer(s) 104 abandoned the advertisement(s) 102 and via information obtained associated with the abandonment of the advertisement 102 (e.g., a topic of the advertisement 102, current content 108 being present, geographical area, contextual characteristic(s) 128, and so forth). As such, the ML model(s) 138 may provide insight to not present certain advertisement(s) 102 to limit the number of viewer(s) 104 who abandon the content 108 and/or the advertisement(s) 102. In some instances, the ML model(s) 138 may be updated during scheduled background workflows and/or according to predetermined schedules (e.g., once per hour, once per day, etc.).

As such, the advertisement exchange 114 may use the ML model(s) 138 to determine which combinations of advertisement(s), audience segment(s) 130, and/or contextual characteristic(s) 128 correlate to probabilities 140 of the viewer 104 abandoning the content 108 and/or the advertisement(s) 102. In either event, the abandonment of the viewer 104 represents lost revenue associated with showing future advertisement(s) 102. In an effort to overcome this deficiency, the results of the ML model(s) 138 may block those combinations from showing to increase viewer retention.

The block list(s) 142 are used by the advertisement exchange 114 when requesting advertisements and when filtering the advertisements 102. For example, during advertising break(s) the MVPD 110 may communicate with the advertisement exchange 114 for obtaining advertisement(s) 102 presented to the viewer(s) 104. As part of this request, the MVPD 110 may also transmit the contextual characteristic(s) 128, details of the viewer 104 and/or the viewer device(s) 106, and/or the content 108 currently being played. The advertisement exchange 114 may then use the advertisement request 116 for determining which advertisement(s) 102 to present and/or to refrain from presenting.

In some instances, each of the advertisement(s) 102 may be associated with an advertisement identification that is used to uniquely identify each of the advertisement(s) 102. These advertisement identification (ID) may be stored on the block list(s) 142 and used when filtering advertisement(s) 102 presented to the viewer 104. However, some advertisement(s) 102 may have hidden or unknown identifiers. In such instances, the advertisement exchange 114 may attempt to unwrap the advertisement 102 for use in determining specifics of the advertisement 102 (e.g., the advertiser 124, content, topic, goods, services, etc.).

In some instances, the block list(s) 142 and/or the ML model(s) 138 may provide the advertiser(s) 124 with information for optimizing advertisement campaigns. For example, the advertiser(s) may change targeting an advertisement 102 to better target an audience that may be more likely to purchase the product and/or services. In such instances, the advertiser(s) 124 may avoid spending resource(s) in certain contexts and/or on certain audience segment(s) 130 that are likely to not watch their advertisement(s) 102 in their entirety. Knowing this information at the outset may avoid the MVPD 110, the advertisement exchange 114, and/or the advertiser(s) 124 expending computing resource(s) associated with the selection of advertisement(s) 102 that ultimately have a high probability of being abandoned by the viewer 104. Such instances also represent a loss of revenue for the MVPD 110. For example, in instances where the viewer(s) 104 abandoned an advertisement, the MVPD 110 misses out on opportunities to collect revenues associated with further advertisement(s) 102 selected for presenting to the viewer 104.

The viewer device(s) 106, MVPD 110, advertisement exchange 114, and/or advertiser(s) 124 may communicate with one another via a network 144. For example, the MVPD 110 may send the advertisement request(s) 116 via the network 144 to the advertisement exchange 114. The MVPD 110 may also provide the content 108 and the advertisement(s) 102 to the viewer device(s) 106 via the network 144. The network 144 may represent any type of communication network, including a data network, and may be implemented using wired infrastructure (e.g., cable, CATS, fiber optic cable, etc.), a wireless infrastructure (e.g., RF, cellular, microwave, satellite, Bluetooth, etc.), and/or other connection protocols.

In some instances, the advertisement exchange 114 may represent an advertisement server working in conjunction with a number of platforms, systems, and/or third-party databases. The advertisement exchange 114 may communicate with these various platforms, systems, and/or third-party databases via the network 144. For example, the advertisement exchange 114 may work in conjunction with a number of other supply-side advertising systems (e.g., SpotX) and/or demand-side advertising systems 150 (e.g., The TradeDesk) for obtaining the advertisements 102, presenting the advertisements 102, and/or otherwise determining which of the advertisements 102 to present or to not present to the viewers 104.

Although the above discussion relates to the advertisement exchange 114 utilizing the ML model(s) 138 for generating block list(s) 142, in some instances, the MVPD 110 may have access to or include the ML model(s) 138. In such instances, the MVPD 110 may include information for training the ML model(s) 138 and/or generating the block list(s) 142. Moreover, in some instances, the MVPD 110, the advertisement exchange 114, and/or the advertiser(s) 124 may be embodied within a single system. Still, in some instances, the MVPD 110 may not communicate with the advertisement exchange 114, but may have access to its own advertisement(s) 102 for presenting to the viewer(s) 104. Additionally, although FIG. 1 illustrates the MVPD 110 and/or the advertisement exchange 114 including certain components, the MVPD 110 and/or the advertisement exchange 114 may include additional components, modules, engines, hardware, and/or software associated with determining the probabilities 140 of the viewer(s) 104 abandoning the content 108 and/or advertisement(s) 102.

As used herein, a processor, such as processor(s) 112 and/or the processor(s) 118 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 136 and/or the memory 120 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 2-5 illustrate various processes related to determining probabilities associated with viewers abandoning advertisements and using these probabilities for filtering advertisements. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIG. 1, although the processes may be implemented in a wide variety of other environments, architectures, and systems.

Figure 2:
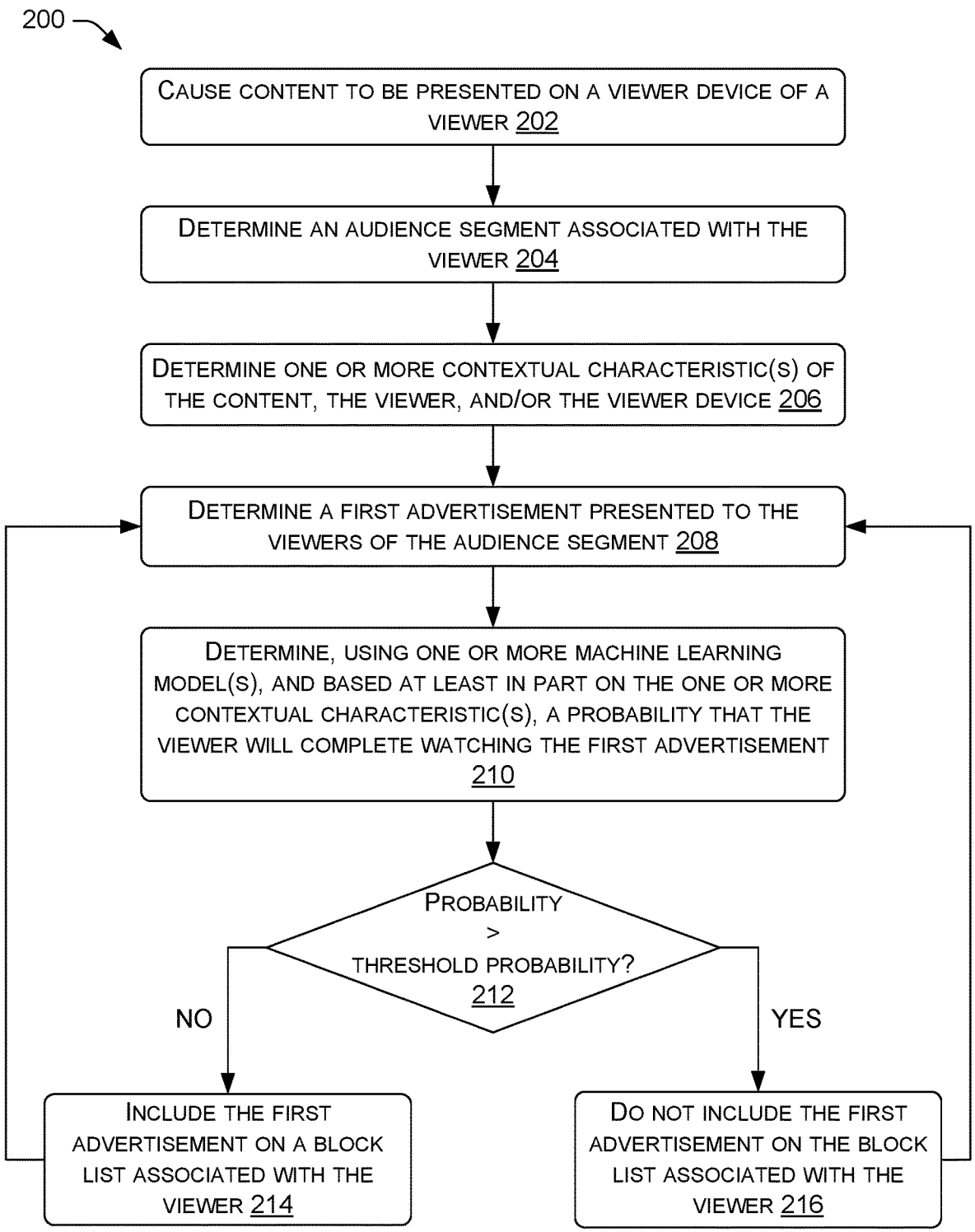
FIG. 2 illustrates an example process for determining a probability of a viewer abandoning supplementary content and including the supplementary content on a block list, according to an embodiment of the present disclosure.

FIG. 2 illustrates an example process 200 for determining the probability 140 of the viewer 104 abandoning advertisement(s) 102 and using the probability 140 to refrain from presenting the advertisement 102.

At 202, the process 200 may cause content to be presented to a viewer. For example, the MVPD 110 may cause content 108 (e.g., television stream) to be presented on the viewer device 106 associated with the viewer 104. In some instances, the viewer device 106 may include applications and/or interfaces of the MVPD 110 for presenting the content 108.

At 204, the process 200 may determine an audience segment associated with the viewer. For example, the advertisement exchange 114 may determine audience segment(s) 130 to which the viewer 104 is associated with. By way of example, if the viewer 104 is a female that lives in Portland, Oreg., and/or enjoys watching documentaries, the viewer 104 may be associated with an audience segment 130 including these traits. Viewers 104 of the same audience segment 130 may have similar behaviors, interests, characteristic, and so forth. Discussed herein, the audience segment(s) 130 may be used when determining or selecting advertisement(s) 102 for presenting to the viewer 104. In some instances, as the viewer 104 may belong to multiple audience segment(s) 130, the audience segment 130 selected at 204 may be based on the current content 108 being displayed for targeting advertisements 102 to the viewer 104.

At 206, the process 200 may determine one or more contextual characteristic(s) of the content, the viewer, and/or the viewer device. For example, based at least in part on the content 108 being presented, characteristic(s) of the viewer 104, and/or the type of viewer device 106 (or characteristics associated therewith) the advertising exchange 114 may determine contextual characteristic(s) 128. In some instances, the contextual characteristic(s) 128 may include a subject or topic of the content 108 being presenting, a channel or program of the content 108, a position within the content 108 being viewed by the viewer 104, a location/time at which the viewer 104 watches the content 108, a screen resolution of the viewer device 106, a type of viewer device 106, and so forth.

At 208, the process 200 may determine a first advertisement presented to viewers of the audience segment. For example, by determining the audience segment 130 (or audience segments 130) to which the viewer 104 belongs, the process 200 may determine a first advertisement that was previously presented to the viewers 104 of that audience segment 130. In some instances, the first advertisement may be one of a plurality (e.g., tens, hundreds, thousands, etc.) presented to viewer(s) of the audience segment 130.

At 210, the process 200 may determine, using one or more machine-learning model(s), and based at least in part on the one or more contextual characteristic(s), a probability that the viewer will complete watching the first advertisement.

For example, in an effort to avoid the viewer 104 abandoning the content 108 and/or advertisement(s) 102, the advertising exchange 114 may utilize the ML model(s) 138 to determine a likelihood that the viewer 104 will finish watching the advertisement 102. The likelihood, or the probability 140, may represent, based on the one or more contextual characteristic(s) 128, whether the viewer 104 will abandon the first advertisement 102 and/or finish watching the first advertisement 102. In some instances, the ML model(s) 138 may be previously trained from viewer(s) 104 of the audience segment 130 who did not complete watching the first advertisement 102 and/or completed watching the first advertisement 102. As part of calculating the probability 140, the ML model(s) 138 may compare the contextual characteristic(s) 128 of the viewer 104 with those of the viewers within the audience segment 130. For example, certain contextual characteristic(s) 128 may indicate that viewers 104 of the audience segment 130 do not abandon the first advertisement 102, while other contextual characteristic(s) 128 may indicate that viewers 104 of the audience segment 130 abandon the first advertisement 102. As such, the contextual characteristic(s) 128 may be compared via the ML model(s) 138 to determine the probability 140 of the viewer abandoning the first advertisement 102. Additionally, or alternatively, other characteristics may be used for determining the probability 140, such as demographics of the viewer 104, a geographical location of the viewer 104, purchasing histories of the viewer 104, and so forth. In such instances, the ML model(s) 138 may accept this information as input(s) for use in generating the probability 140.

At 212, the process 200 may determine whether the probability is greater than a threshold probability. For example, based on the calculated probability 140, the advertisement exchange 114 may compare the probability 140 to the threshold probability. The threshold probability may represent a threshold of the viewer watching the advertisement 102 in its entirety or abandoning the advertisement 102. For example, the probability 140 may be 98%. If the probability 140 is greater than the threshold probability, this may indicate that the viewer 104 is not likely to abandon the advertisement 102. However, if the probability 140 is less than the threshold probability, this may indicate that the viewer 104 is likely to abandon watching the first advertisement 102.

If at 212, the process 200 determines that the probability is less than the threshold probability, the process 200 may follow the "NO" route and proceed to 214.

At 214, the process 200 may include the first advertisement on a block list associated with the viewer. For example, based at least in part on determining that the probability 140 does not satisfy the threshold probability, the advertisement exchange 114 may determine to not present the first advertisement 102 to the viewer 104 and accordingly, may place the advertisement 102 on the block list 142. In other words, presenting the first advertisement 102 based on the contextual characteristic(s) 128, may lead to decreased viewer experiences and/or the viewer 104 abandoning the first advertisement 102 and/or content 108.

From 214 the process 200 may loop to 208 to determine a second advertisement 102 presented to the viewers 104 of the audience segment 130. After determining the second advertisement 102, the process 200 may continue to 210 and 212 for determining the probability 140. As such, the process 200 may repeat for determining whether to present the advertisements 102 to the viewer 104. Moreover, in instances where the viewer 104 changes content 108, viewer device 106, and so forth, such indications may be received for determining the probabilities 140 of the advertisements 102 for another audience segment 130 and using the different contextual characteristic(s) 128.

Alternatively, if at 212 the process 200 determines that the probability is greater than the threshold probability, the process 200 may follow the "YES" route and proceed to 216. At 212, the process 200 may determine to not include the first advertisement on the block list associated with the viewer. For example, if the probability 140 does not indicate that the viewer 104 is likely to abandon the first advertisement 102, the process 200 may determine to present the first advertisement 102 (or that the first advertisement 102 is suitable for presenting based on the contextual characteristic(s) 128). From 216, the process 200 may loop to 208 for determining an additional advertisement 102 for determining the probability 140 of viewer abandonment (e.g., second advertisement, third advertisement, etc.).

Accordingly, the process 200 and/or the methods herein may determine probabilities 140 for a plurality of advertisement 102 and/or for a plurality of viewers 104 across audience segments 130 and based on the contextual characteristic(s) 128. In such instances, the block list(s) 142 of respective viewer(s) 104 and/or audience segments 130 may be updated based on feedback of the viewer(s) 104 watching the advertisement(s) 102 and indications whether the viewer(s) 104 watch the advertisement(s) 102 in their entirety or abandoned the advertisement 102. For example, the process 200 could repeat for a second audience segment 130 to which the viewer 104 belongs.

Figure 3:
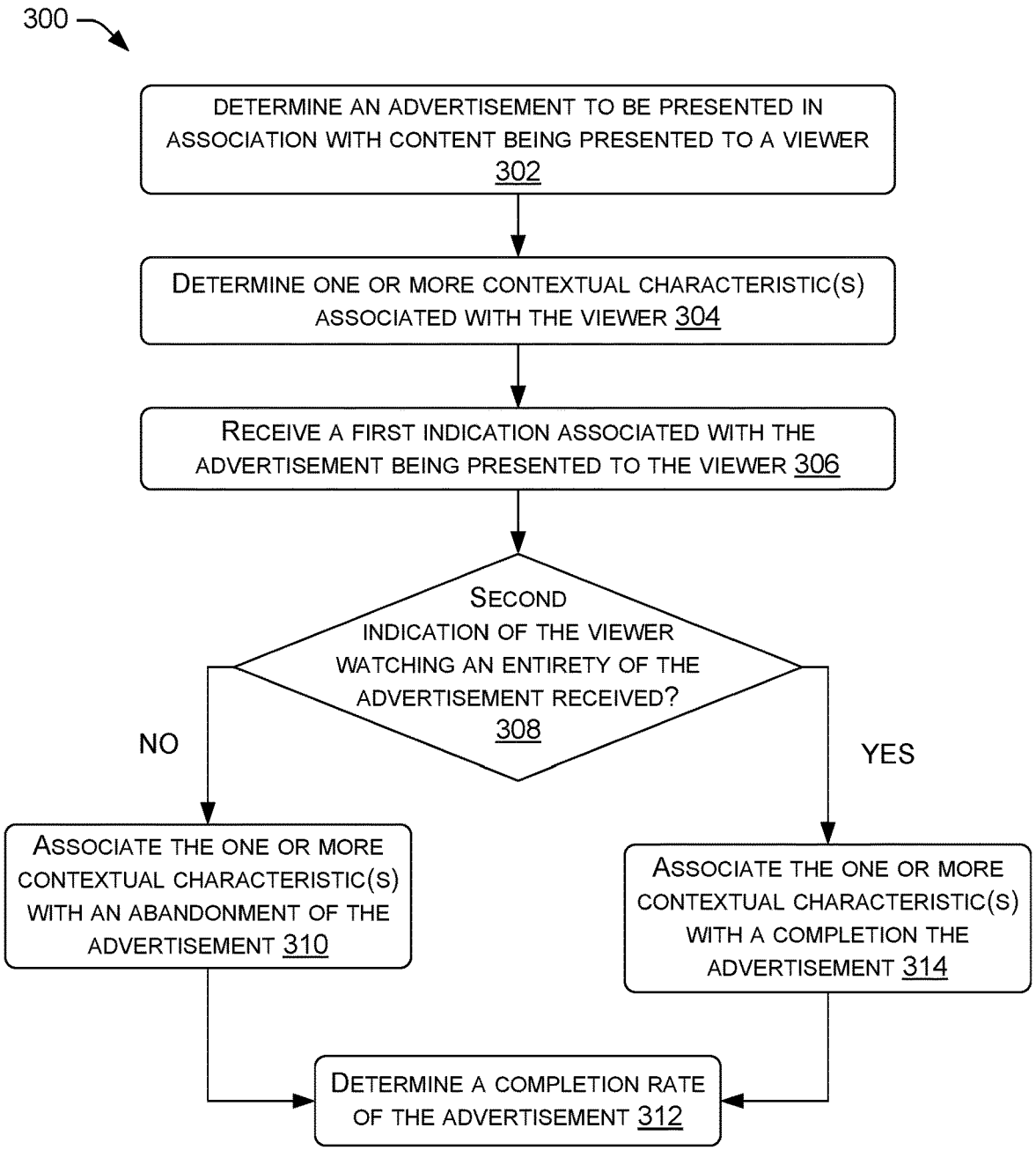
FIG. 3 illustrates an example process for associating contextual characteristic(s) with an abandonment or completion of supplementary content, according to an embodiment of the present disclosure.

FIG. 3 illustrates an example process 300 for associating advertisement(s) 102 with contextual characteristic(s) 128 based on feedback received from viewer(s) 104 viewing the advertisement(s) 102.

At 302, the process 300 may determine an advertisement to be presented in association with content being present to a viewer. For example, the advertisement exchange 114 may determine an advertisement 102 to be presented in association with the content 108. The advertisement exchange 114 may determine the advertisement 102 in response to receiving the advertisement request 116 from the MVPD 110. In some instances, the advertisement exchange 114 may determine the advertisement 102 based on the advertisement 102 not violating a block list of the viewer 104 and the completion rate 132 of the advertisement 102 being greater than a threshold and/or the probability 140 of completion being greater than the threshold.

At 304, the process 300 may determine one or more contextual characteristic(s) associated with the viewer. For example, the advertisement exchange 114 may determine the contextual characteristic(s) 128, such as the program being presented or the content 108 to the first viewer 104, a viewer device 106 used by the viewer 104 to view the content 108, a time of day of the viewer 104 watching the content 108, and so forth. Discussed herein, the contextual characteristic(s) 128 may be utilized by the advertisement exchange 114 when gleaning information associated with the context in which the advertisement 102 was presented, for use in determining whether the advertisement 102 is to be presented to the viewer 104 and/or other viewer(s) 104.

At 306, the process 300 may receive a first indication associated with the viewer watching the advertisement, or that the advertisement is being presented to the viewer (e.g., being played back). For example, upon the advertisement 102 being presented on the viewer device 106, the advertisement exchange 114 may receive the tracking event(s) 134 during a playback of the advertisement 102. Initially, however, upon playback, the advertisement exchange 114 may receive an indication that the advertisement is being played on the viewer device 106. In some instances, and if the viewer 104 watches the advertisement 102, the advertisement exchange 114 may receive the tracking event(s) 134 throughout the presentation of the advertisement 102. Such indications may be used to determine whether the viewer 104 completed watching the advertisement 102 and/or whether the viewer 104 abandoned the advertisement 102 (e.g., turned off viewer device 106, switched program(s), etc.). In such instances, the advertising exchange 114 may receive multiple tracking event(s) 134 that represent a progress of the viewer 104 watching the advertisement 102. Such tracking event(s) 134 may be used to determine an amount of the advertisement 102 watched by the viewer 104.

At 308, the process 300 may determine whether a second indication is received associated with the viewer watching an entirety of the advertisement. For example, based at least in part on receiving the tracking event(s) 134, the process 300 may determine whether the viewer 104 watched an entirety of the advertisement 102. However, noted above, in some instances the advertisement exchange 114 may receive indications between the first indication and the second indication that represent a progression of the viewer 104 watching the advertisement 102. Upon completion of the playback of the advertisement 102, the advertisement exchange 114 may receive an indication of such. That is, the advertisement exchange 114 may receive an indication that the advertisement 102 completed playback. Alternatively, if the process 300 did not receive such an indication, the process 300 may determine that the viewer 104 did not complete watching the advertisement 102. That is, a lack of receiving an indication that the advertisement 102 completed a playback may be used to determine that the advertisement 102 was not watched in its entirety. In some instances, if the advertisement exchange 114 did not receive the second indication within a threshold amount of time since receiving the first indication, the advertisement exchange 114 may infer that the viewer 104 abandoned the advertisement 102 (e.g., timeout). If at 308, the process 300 determines that the viewer 104 did not watch the entirety of the advertisement 102, the process 300 may follow the "NO" route and proceed to 310.

At 310, the process 300 may associate the one or more contextual characteristic(s) with an abandonment of the advertisement. For example, as the viewer 104 did not complete watching the advertisement 102, the advertisement exchange 114 may glean information and correlations to avoid presenting the advertisement(s) 102 to like viewer(s) 104 in similar context(s) and under similar contextual characteristic(s) 128. In some instances, the advertisement exchange 114 may utilize the ML model(s) 138 for determining relationships between the contextual characteristic(s) 128, the content 108, the advertisement 102, the completion rate 132, and/or the audience segment 130. These relationship(s) may be used for determining whether to prevent the advertisement 102 in future instances. For example, if the content 108 was a science-fiction documentary, the first viewer 104 is a thirty-year old male, and the advertisement 102 relates to kitchen appliances, the ML model(s) 138 may determine that the advertisement 102 was potentially irrelevant to the viewer 104 and to not present the advertisement 102 (given similar circumstances that the viewer 104 abandoned the advertisement 102) to viewer(s) of the audience segment 130, under similar contextual characteristic(s) 128. As another example, if the viewer 104 abandoned the advertisement under certain contextual characteristic(s) 128 (e.g., first device, first location, first time), then under similar contextual characteristic(s) 128 (e.g., second device, second location, second time, etc.) that are similar, viewers 104 of the audience segment 130 may be likely to abandon the advertisement 102.

In some instances, as part of associating the one or more contextual characteristic(s) 128 with an abandonment of the advertisement, the process 300 may include the advertisement 102 on a block list associated with the viewer. The block list 142 of the viewer 104 may include advertisements 102 that are not to be presented to the viewer 104 based on certain contextual characteristic(s) 128 and/or under certain conditions (e.g., content, etc.).

At 312, the process 300 may determine a completion rate of the advertisement. For example, the advertisement exchange 114 may determine an updated completion rate 132 of the advertisement 102. In some instances, the completion rate 132 may represent viewers 104 viewing an entirety of the advertisement 102. For example, if the first indication (at 306) and the second indication (at 308) are received (i.e., examining the advertisement 102 starting playback against the advertisement 102 completing playback), this may indicate a completion of the advertisement 102 by the viewer 104. As such, based on the viewer 104 not watching an entirety of the advertisement 102, the completion rate 132 of the advertisement 102 may be reduced. The completion rate 132, may be used when determining whether to present the advertisement 102 to other viewer(s) 104 that are included in similar audience segment(s) 130 as the viewer 104. In some instances, the advertisement 102 may additionally, or alternatively, be placed on a block list 142 of an audience segment 130 associated with the viewer.

Alternatively, if at 308, the process 300 determines that the indication is indicative of the viewer watching an entirety of the advertisement, the process 300 may follow the "YES" route and proceed to 318.

At 318, the process 300 may associate the one or more contextual characteristic(s) with a completion of the advertisement. For example, based at least in part on the viewer watching an entirety of the advertisement 102, the advertisement exchange 114 may determine that the advertisement 102 is relevant, appropriate, or otherwise suited for presentation during the content 108, to like viewers (e.g., the audience segment 130), and/or under similar contextual characteristic(s) 128. As part of this process and/or associating, the advertisement exchange 114 may associate the advertisement with the contextual characteristic(s) 128.

From 314, the process 300 may proceed to 312 whereby the completion rate 132 of the advertisement 102 may be determined.

Figure 4:
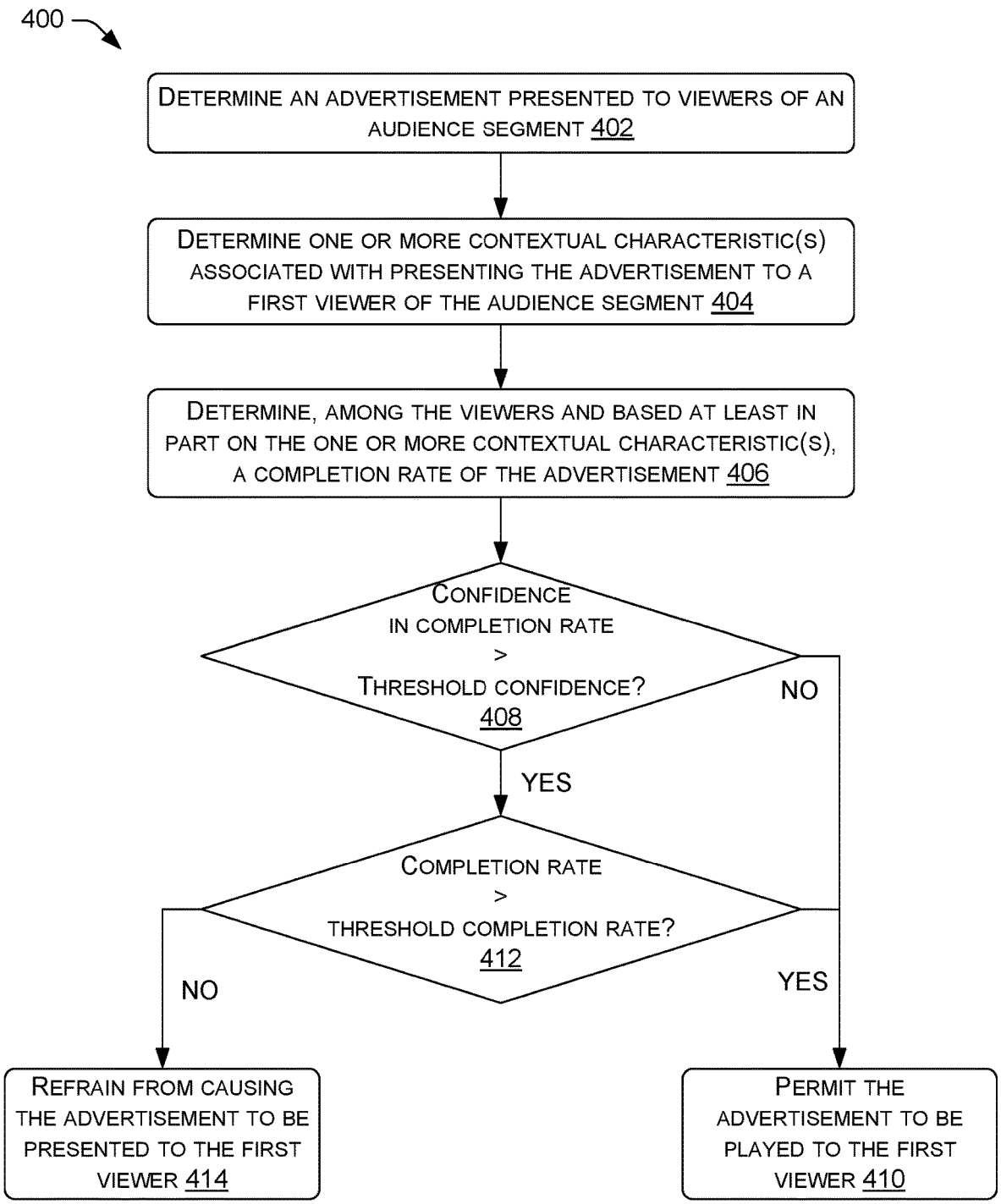
FIG. 4 illustrates an example process for determining a completion rate of supplementary content for use in determining whether to present the supplementary content, according to an embodiment of the present disclosure.

FIG. 4 illustrates an example process 400 for comparing contextual characteristic(s) 128 and determining whether to present advertisements 102.

At 402, the process 400 may determine an advertisement presented to viewers of an audience segment. For example, the advertisement exchange 114 may receive an indication or access a history of the viewers 104 of the audience segment 130 for determining advertisements 102 that were presented to the viewers 104. The advertisement exchange 114 may maintain a history of the advertisements 102 presented to the viewers in the audience segment 130.

At 404, the process 400 may determine one or more contextual characteristic(s) associated with presenting the advertisement to a first viewer of the audience segment. For example, the advertisement exchange 114 may determine a viewer device 106 used by the first viewer 104 to watch content 108, a time/date in which the first viewer 104 is watching the content 108, the type of content 108 being displayed, and so forth. However, the process 400 may determine any number of contextual characteristic(s) 128 of the viewer 104 and/or the content 108 being displayed.

At 406, the process 400 may determine, among the viewers and based at least in part on the one or more contextual characteristic(s), a completion rate of the advertisement. For example, using the ML model(s) 138, the advertisement exchange 114 may compare the one or more contextual characteristic(s) 128 to locate viewer(s) 104 of the audience segment 130 that have similar contextual characteristic(s) 128. For example, the advertising exchange 114 may locate viewer(s) 104 that have a similar device type as the first viewer 104, viewer(s) 104 that were watching similar content 108, and so forth. These contextual characteristic(s) 128 may represents inputs to the ML model(s) 138 for determining the completion rate 132. Based on locating the viewer(s) 104 that have similar contextual characteristic(s) 128, the process 400 may determine a completion rate of those viewer(s) 104 watching the advertisement 102. In doing so, the process 400 may determine the completion rate 132 of those viewer(s) completing the advertisement 102 under similar contexts, conditions, and/or circumstances.

At 408, the process 400 may determine whether a confidence in the completion rate is greater than a threshold confidence. For example, the ML model(s) 138 may have a certain confidence associated with the determined completion rate 132 or the probability 140 that the viewer 104 will complete the advertisement 102. In some instances, the confidence may be based at least in part on a sample size used to train the ML model(s) 138. For example, given that the ML model(s) 138 are trained from historical data (e.g., the training advertisements 148) and the contextual characteristic(s) 128, the output of the ML model(s) 138 may have a corresponding confidence level. By way of example, based on one or more contextual characteristic(s) 128 determined at 404 (e.g., type of viewer device 106, genre of content 108, live or streaming, etc.), the advertisement exchange 114 may determine how many other viewers 104 of an audience segment 130 have similar contextual characteristic(s). This amount, or sample size, may represent or be used to determine a confidence in the probability 140 that is output by the ML model(s) 138. That is, if the ML model(s) 138 was trained on a limited set of data, the confidence may be lower than ML model(s) 138 that was trained on a greater set of data. As such, based on the contextual characteristic(s) 128, the ML model(s) 138 may have a corresponding confidence that the viewer 104 will watch the advertisement 102, and using this confidence, the process 400 may determine the reliability of the output of the ML model(s) 138. A high confidence may indicate that the probability 140 output by the ML model(s) 138 is trustworthy, while a lower confidence may indicate that the probability 140 output by the ML model(s) 138 is not trustworthy (or not as trustworthy).

At 408, if the process 400 determines that the confidence is not greater than a threshold confidence, the process may follow the "NO" route and proceed to 410.

At 410, the process 400 may permit the advertisement to be displayed. For example, the advertisement exchange 114 may permit the advertisement 102 to be presented in instances where the advertisement exchange 114 is not confident in the completion rate 140 (e.g., low sample size for the contextual characteristic(s) 128). That is, even if the process 400 determines that the completion rate 140 is low, for example, the process 400 may not be confident in such result. For example, if the ML model(s) 138 was trained on a sample size of one (e.g., only one other viewer 104 had the same or similar contextual characteristic(s) 128), the probability 140 output by the ML model(s) 138 may not be trustworthy enough to refrain from presenting the advertisement 102.

Alternatively, if at 408 the process 400 determines that the confidence in the completion rate is greater than the threshold confidence, the process 400 may follow the "YES" route and proceed to 412. That is, if the ML model(s) 138 was trained on a sufficient sample size, for example, the probability 140 output by the ML model(s) 138 may be trustworthy.

At 412, the process 400 may determine whether the completion rate is greater than a threshold completion rate. For example, the completion rate 132 determined at 406 may be compared against a threshold. This threshold may be determined statistically or historically across previously advertisements 102 being presented and may be defined by the advertisement exchange 114 and/or the MVPD 110. If at 412 the process 400 determines that the completion rate is not greater than the threshold completion rate, the process 400 may follow the "NO" route and process to 414.

At 414, the process 400 may refrain from causing the advertisement to be presented to the first viewer. For example, in instances where the completion rate 132 is less than the threshold completion rate, the advertisement exchange 114 may refrain from causing the advertisement 102 being displayed to avoid the first viewer 104 abandoning the advertisement 102. That is, given the historical frequency of the viewer(s) 104 in the audience segment 130 abandoning the advertisement 102, based on the contextual characteristic(s) 128, the probability 140 of the viewer 104 completing the advertisement 102 may be less than the threshold and as such, the advertisement 102 may be refrained for presentation.

Alternatively, if at 412 the process 400 determines that the completion rate is greater than the threshold completion rate, the process may follow the "YES" route and proceed to 410 whereby the process 400 may permit the advertisement to be played to the first viewer.

Figure 5:
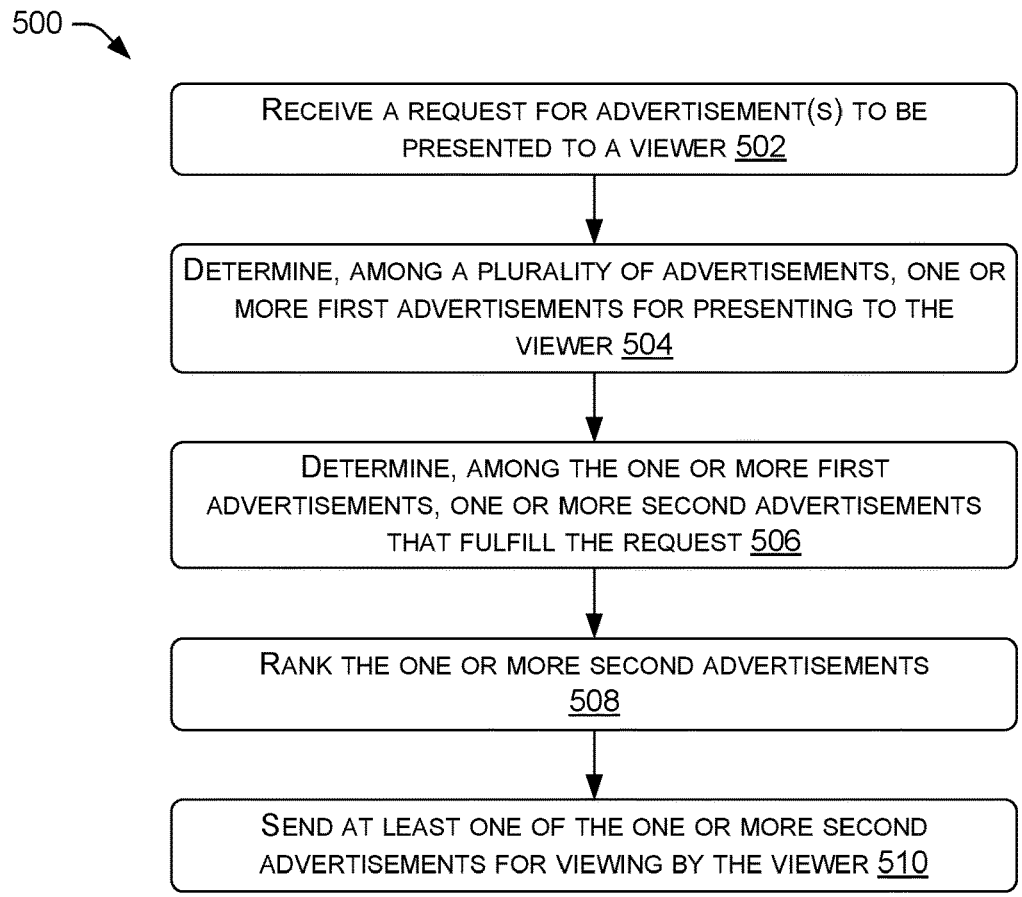
FIG. 5 illustrates an example process for determining supplementary content to present to a viewer, according to an embodiment of the present disclosure.

FIG. 5 illustrates an example process 500 associated with receiving a request for an advertisement 102.

At 502, the process 500 may receive a request for an advertisement to be presented to a viewer. For example, the advertisement exchange 114 may receive the advertisement request 116 from the MVPD 110. In some instances, the advertisement request 116 may include the contextual characteristic(s) 128.

At 504, the process 500 may determine, among a plurality of advertisements, one or more first advertisements for presenting to the viewer. For example, the bid request manager 122 may receive bids from the advertiser(s) 124 associated with fulfilling the advertisement request 116. In some instances, the bid request manager 122 may post bids for the advertisements 102. Additionally, the bid request manager 122 may not accept or receive bids for advertisements 102 that would otherwise violate the block list(s) 142 and/or have probabilities 140 less than the threshold probability. That is, the advertisement exchange 114 may utilize the previously generated block list(s) 142 for filtering out those advertisements 102 previously determined.

At 506, the process 500 may determine, among the one or more first advertisements, one or more second advertisements. For example, the advertisement selection manager 126 may filter the advertisements 102 submitted during the bidding process to remove advertisements that do not fulfill the request. In some instances, the advertisement selection manager 126 may remove advertisements 102 that were returned during the bidding process, but which are on block list(s) 142 of the viewer 104. In some instances, the advertisement selection manager 126 may unwrap the advertisements 102 to determine content of the advertisement 102 in order to determine whether or not to block the advertisement 102. Additionally, or alternatively, the advertisement selection manager 126 may access metadata of the advertisement 102 to determine specifics of the advertisement 102.

At 508, the process may rank the one or more advertisements in accordance with the request. For example, the advertisement selection manager 126 may rank the advertisements 102 that fulfill the request, according to specifics of the request. Here, the advertisement selection manager 126 may use knowledge about the audience segment 130, the content 108, the contextual characteristic(s) 128, etc. for determining which advertisement(s) 102 the viewer 104 is likely to watch. As part of this process, the advertisement selection manager 126 may use one or more machine-learning models for selecting a highest ranked advertisement 102. For example, if the viewer 104 is watching a romance sitcom, the advertisement selection manager 126 may select an advertisement about jewelry, beauty products, and/or clothes, as compared to home improvement advertisements.

At 510, the process 500 may send at least one of the one or more second advertisements for viewing by the viewer. For example, after the advertisement selection manager 126 selects an advertisement, the advertisement exchange 114 may send this advertisement 102 to the MVPD 110. Therein, the MVPD 110 may cause this advertisement to be presented to the viewer 104.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more computer-readable media storing instructions that, when executed, cause the one or more processors to perform operations comprising:
  receiving a request to present one or more supplementary content items during presentation of a content item to a viewer;
  identifying a potential supplementary content item to present to the viewer, the potential supplementary content item being associated with a completion rate that represents viewers watching an entirety of the potential supplementary content item;
  determining, for the potential supplementary content item, a probability associated with the viewer watching the entirety of the potential supplementary content item, the probability being based at least in part on the completion rate;
  determining that the probability is equal to or greater than a threshold probability; and
  based at least in part on the probability being equal to or greater than the threshold probability, causing the potential supplementary content item to be presented to the viewer.

2. The system of claim 1, the operations further comprising determining one or more contextual characteristics associated with the content item, the one or more contextual characteristics including at least one of:
  subject matter of the content item;
  a time of day at which the viewer views the content item;
  a language associated with a viewer device used to watch the content item; or
  a type of the viewer device on which the content item is presented,
  wherein determining the probability is based at least in part on the one or more contextual characteristics.

3. The system of claim 1, the operations further comprising:
  determining a confidence associated with the probability;
  determining that the confidence is greater than or equal to a threshold confidence; and
  wherein causing the potential supplementary content item to be presented to the viewer is further based at least in part on the confidence being greater than or equal to the threshold probability.

4. The system of claim 1, where the potential supplementary content item comprises a first potential supplementary content item and the probability comprises a first probability, the operations further comprising:
  identifying a second potential supplementary content item to present to the viewer;
  determining, for the second potential supplementary content item, a second probability associated with the viewer watching less than a second entirety of the second potential supplementary content item;
  determining that the second probability is less than the threshold probability; and
  based at least in part on the second probability being less than the threshold probability, refraining from causing the second potential supplementary content item to be presented to the viewer.

5. The system of claim 1, the operations further comprising:
  determining that the viewer watched less than the entirety of the potential supplementary content item; and
  associating contextual characteristics of the potential supplementary content item with the viewer watching less than the entirety of the potential supplementary content item, wherein associating the contextual characteristics with the viewer watching less than the entirety of the potential supplementary content item is used to refrain from presenting the potential supplementary content item to one or more additional viewers having at least one contextual characteristic of the contextual characteristics.

6. The system of claim 1, the operations further comprising:
  determining at least one of:
    a subject matter of the content item presented to the viewer;
    a supplementary content item previously presented to the viewer;
    behavioral characteristics of the viewer;
    demographics of the viewer;
    a geographical location of the viewer;
    a type of a device used by the viewer to watch the content item;
    a screen resolution of the device; or
    a language setting of the device and
  providing at least one of the subject matter, the supplementary content item, the behavioral characteristics, the demographics, the geographical location, the type of device, the screen resolution, or the language setting as inputs to a machine-learning model, wherein the machine-learning model is configured to determine the probability.

7. A method comprising:
determining one or more characteristics associated with a content item being presented to a viewer;
determining an audience segment associated with the viewer, wherein viewers within the audience segment have one or more behavior characteristics that are in common with the viewer;
determining a supplementary content item to present to the viewer;
determining, based at least in part on the one or more characteristics and the audience segment, a probability associated with the viewer watching an entirety of the supplementary content item;
determining that the probability satisfies a threshold probability; and
causing, based at least in part on the probability satisfying the threshold probability, the supplementary content item to be presented to the viewer.

8. The method of claim 7, further comprising:
associating the one or more characteristics, the supplementary content item, the audience segment, and the content item; and
causing the supplementary content item to be presented to one or more additional viewers based at least in part on the associating.

9. The method of claim 7, further comprising determining a completion rate of the supplementary content item, the completion rate representing a percentage of viewers that watched the entirety of the supplementary content item, and wherein determining the probability is further based at least in part on the completion rate.

10. The method of claim 7, wherein the supplementary content item comprises a first supplementary content item, further comprising:
identifying a second supplementary content item to present to the viewer;
determining, for the second supplementary content item, a second probability associated with the viewer watching a second entirety of the second supplementary content item;
determining that the second probability fails to satisfy the threshold probability; and
based at least in part on the second probability failing to satisfy the threshold probability, refraining from causing the second supplementary content item to be presented to the viewer.

11. The method of claim 7, wherein the viewer comprises a first viewer, further comprising:
determining that the first viewer watched less than the entirety of the supplementary content item; and
refraining from presenting the supplementary content item to a second viewer associated with the first viewer.

12. The method of claim 7, wherein the one or more characteristics comprise one or more first characteristics, further comprising:
determining, among the viewers in the audience segment, one or more second characteristics associated with the viewers watching the entirety of the supplementary content item; and
determining that at least one of the one or more first characteristics is a same as the one or more second characteristics, wherein determining the probability is further based at least in part on determining that at least one of the one or more characteristics is the same as the one or more second characteristics.

13. The method of claim 7, wherein the viewer comprises a first viewer, further comprising:
receiving an indication associated with the first viewer watching the entirety of the supplementary content item;
determining a second viewer associated with the first viewer; and
determining, based at least in part on receiving the indication, to present the supplementary content item to the second viewer.

14. The method of claim 7, further comprising:
determining a confidence associated with the probability; and
determining that the confidence is greater than or equal to a threshold confidence,
wherein causing the supplementary content item to be presented to the viewer is further based at least in part on the confidence being greater than or equal to the threshold probability.

15. One or more non-transitory computer readable media storing instructions executable by a processor, wherein the instructions, when executed, cause the processor to perform acts comprising:
determining a supplementary content item to present to a viewer;
determining, for the supplementary content item, a completion rate that represents viewers associated with the viewer watching an entirety of the supplementary content item;
determining, based at least in part on the completion rate, a probability associated with the viewer watching the entirety of the supplementary content item;
determining that the probability is greater than or equal to a threshold probability; and
causing the supplementary content item to be presented to the viewer based at least in part on the probability being greater than or equal to the threshold probability.

16. The one or more non-transitory computer readable media of claim 15, wherein the supplementary content item comprises a first supplementary content item and the probability comprises a first probability, the acts further comprising:
determining a second supplementary content item to present to the viewer;
determining a second probability associated with the viewer watching a second entirety of the second supplementary content item
determining that the second probability is less than the threshold probability; and
based at least in part on the second probability being less than the threshold probability, refraining from causing the second supplementary content item to be presented to the viewer.

17. The one or more non-transitory computer readable media of claim 15, the acts further comprising:
receiving an indication associated with the viewer watching the entirety of the supplementary content item; and
determining to present the supplementary content item to one or more additional viewers associated with the viewer.

18. The one or more non-transitory computer readable media of claim 17, wherein the probability comprises a first probability, the acts further comprising:

determining, at a first instance in time, a first confidence associated with a second probability of the one or more additional viewers watching the entirety of the supplementary content item; and determining, at a second instance in time and based at least in part on receiving the indication, a second confidence associated with the second probability of the one or more additional viewers watching the entirety of the supplementary content item, wherein determining to present the supplementary content item to the one or more additional viewers associated with the viewer is based at least in part on the second confidence.

19. The one or more non-transitory computer readable media of claim 15, the acts further comprising:

receiving an indication associated with the viewer watching less than the entirety of the supplementary content item;

determining an updated probability associated with one or more additional viewers watching the entirety of the supplementary content item; and refraining from causing the supplementary content item to be presented to the one or more additional viewers.

20. The one or more non-transitory computer readable media of claim 15, the acts further comprising determining an audience segment associated with the viewer, wherein viewers within the audience segment have one or more behavior characteristics that are in common with the viewer, wherein determining the supplementary content item is further based at least in part on the audience segment.

* * * * *